May 31, 1932.
G. W. CRABTREE
1,860,657
CONTROLLING DEVICE FOR LEAF SPRINGS
Filed May 2, 1929
4 Sheets-Sheet 1
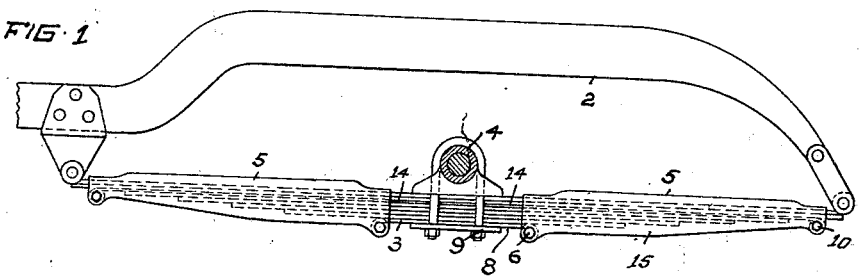
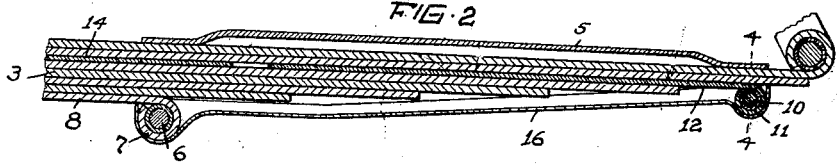
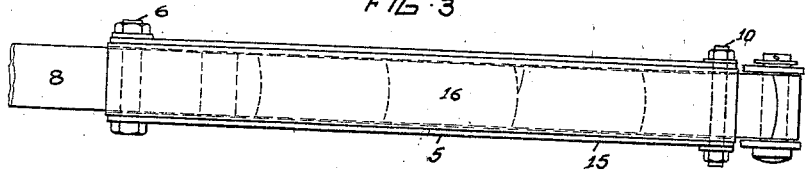
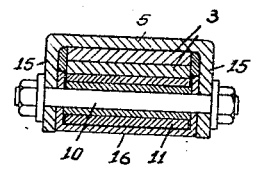
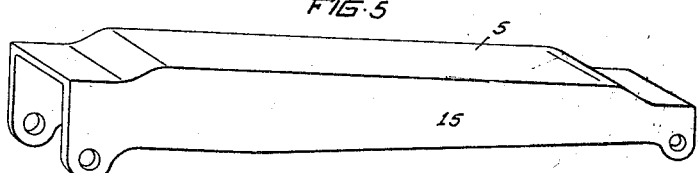
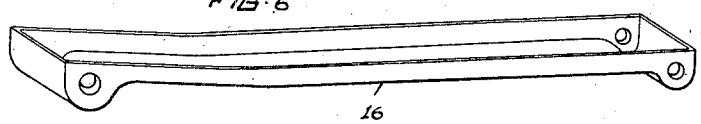
INVENTOR
GEORGE W. CRABTREE
BY
Fisher, Moser & Moore
ATTORNEY May 31, 1932.    G. W. CRABTREE    1,860,657
CONTROLLING DEVICE FOR LEAF SPRINGS
Filed May 2, 1929    4 Sheets-Sheet 2
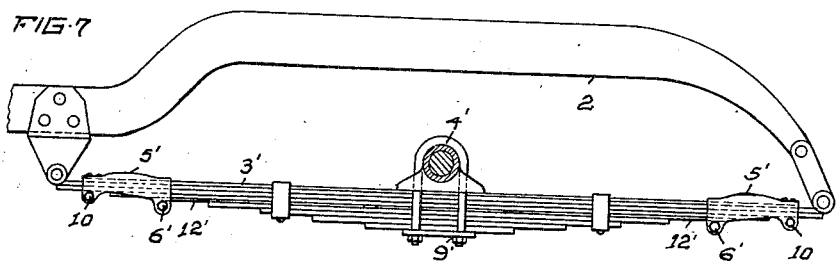
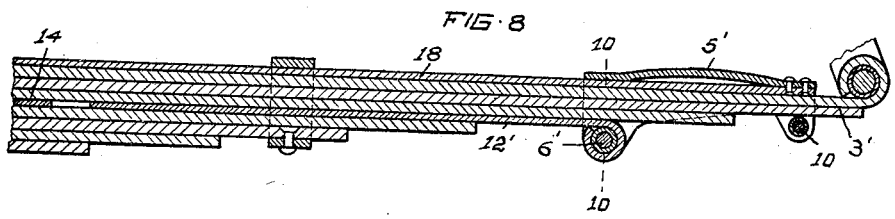
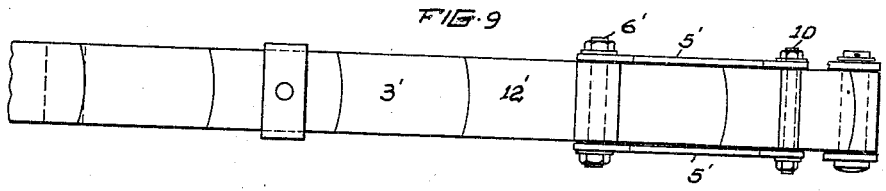
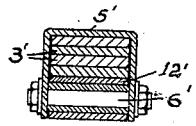
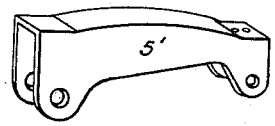
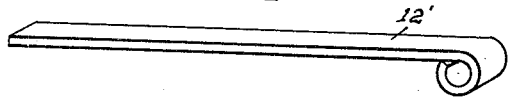
INVENTOR
GEORGE W. CRABTREE
BY
Fisher, Moser + Moore
ATTORNEY May 31, 1932.　　　G. W. CRABTREE　　　1,860,657
CONTROLLING DEVICE FOR LEAF SPRINGS
Filed May 2, 1929　　　4 Sheets-Sheet 3
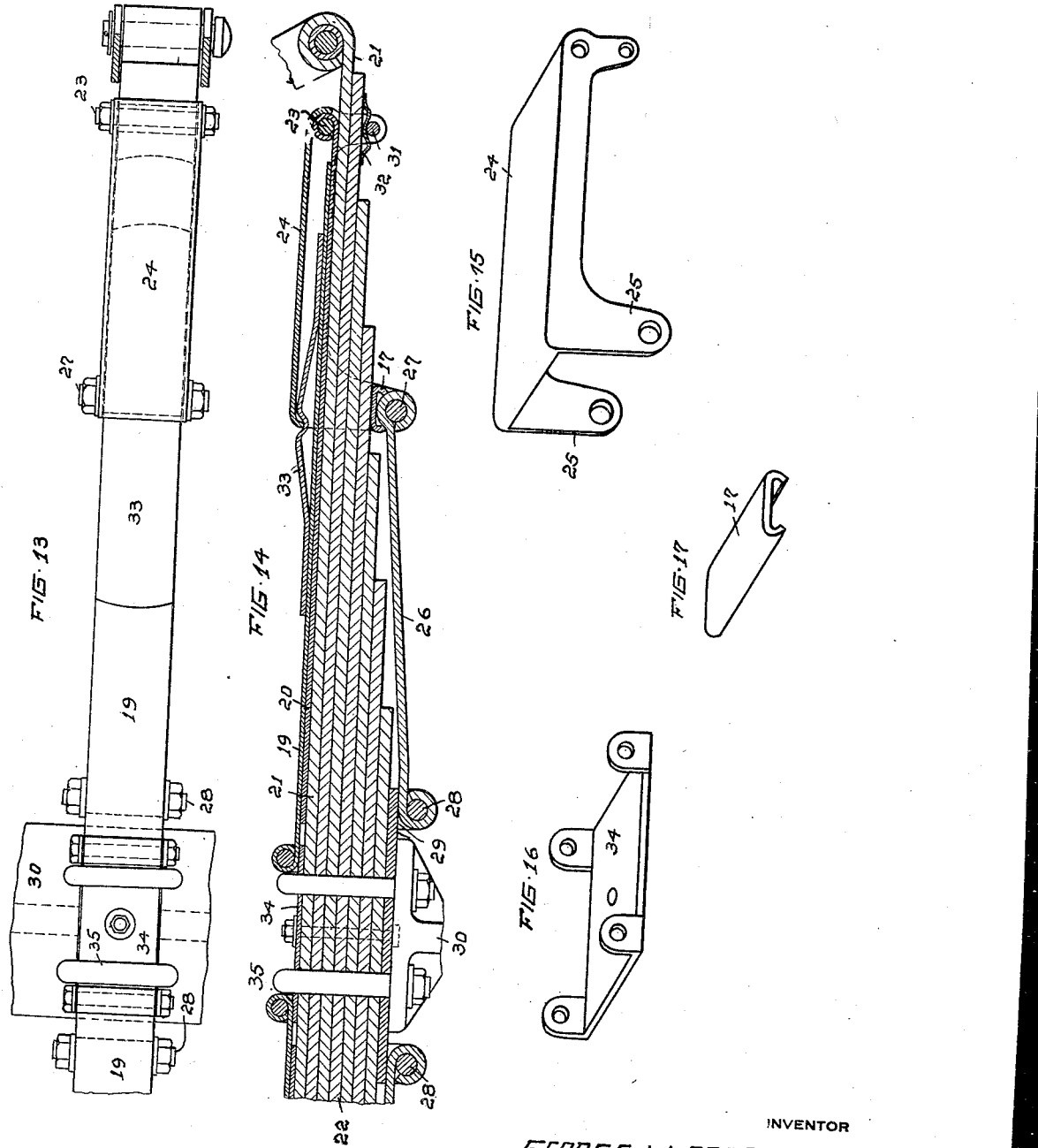
INVENTOR
GEORGE W. CRABTREE
BY
Fisher, Moser & Moore
ATTORNEY May 31, 1932.  G. W. CRABTREE  1,860,657
CONTROLLING DEVICE FOR LEAF SPRINGS
Filed May 2, 1929  4 Sheets-Sheet 4
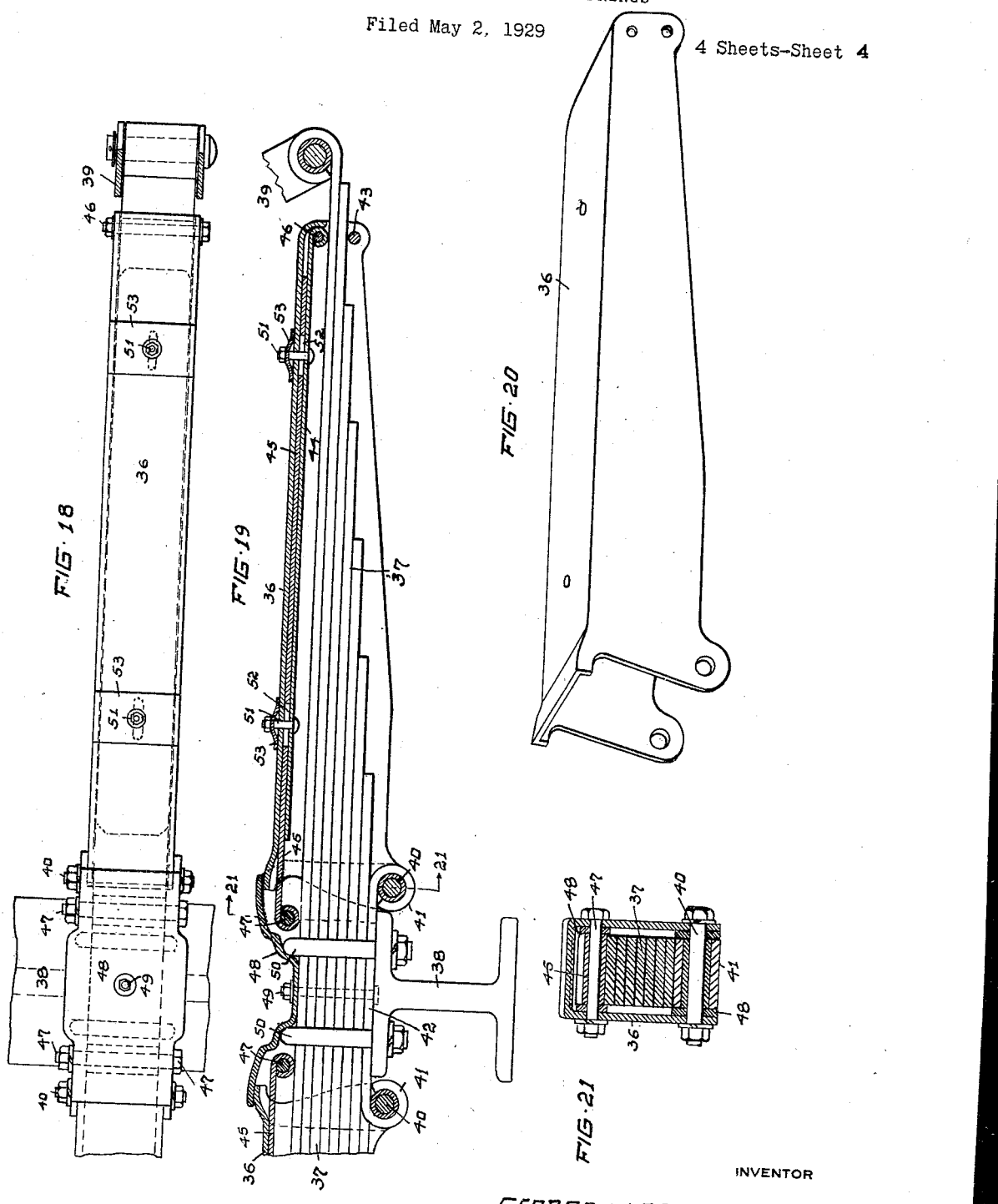
INVENTOR
*GEORGE W. CRABTREE*
BY
*Fisher, Moser & Moore*
ATTORNEY Patented May 31, 1932

1,860,657

UNITED STATES PATENT OFFICE

GEORGE W. CRABTREE, OF CLEVELAND HEIGHTS, OHIO

CONTROLLING DEVICE FOR LEAF SPRINGS

Application filed May 2, 1929. Serial No. 359,841.

My invention pertains to vehicle springs, particularly laminated springs, and involves means for controlling the action thereof, whereby sharp and abrupt shocks may be absorbed or smoothed out and not transmitted to the vehicle body during rapid travel of the vehicle over rough roads.

The controlling means includes frictional members which are connected to the spring in the mode and manner hereinafter shown and described whereby the flexing movements of the spring in either direction will produce relative movement of the friction members longitudinally of the spring. The controlling means may also include or form a part of a casing or cover for the spring.

Thus referring to the accompanying drawings, Fig. 1 is a side elevation of a laminated vehicle spring shackled to the chassis frame of a vehicle and embodying my invention. Fig. 2 is a sectional view, enlarged, showing one of my improved controlling devices connected to a laminated spring, and Fig. 3 is a bottom view of the part shown in Fig. 2. Fig. 4 is a cross section on line 4—4 of Fig. 2. Figs. 5 and 6 are perspective views of the two cover sections for the spring.

Sheet 2: Fig. 7 is a side elevation, corresponding to Fig. 1, showing a modified form of the invention. Fig. 8 is a sectional view and Fig. 9 is a bottom view, of the foregoing invention. Fig. 10 is a cross section on line 10—10 of Fig. 8 and Fig. 11 is a perspective view of the connecting yoke, whereas Fig. 12 is a perspective view of the spring leaf which is connected to one end of said yoke.

Sheet 3: Figs. 13 and 14 are top and sectional views, respectively, of a further modified form of the invention, and Figs. 15, 16, and 17 are perspective views of the connecting yoke, base plate, and bearing plate, respectively.

Sheet 4: Figs. 18 and 19 are plan and section views, respectively, of still another form of the invention, and Fig. 20 is a perspective view of the cover. Fig. 21 is a cross section on line 21—21 of Fig. 19.

Now referring to sheet 1, the operative assembly shown therein comprises a chassis frame 2, and a laminated vehicle spring 3 which is clipped at its middle to an axle 4 and shackled at its opposite ends to chassis frame 2, as customarily. As shown, each end-half of the main spring 3 is provided with controlling devices, which include a casing, cover, or yoke member 5 for the spring. One end of member 5 is pivotally connected by bolt 6 to an eye 7 of a bottom plate or spring leaf 8 of main spring 3. Where main spring 3 is of the semielliptic type two controlling members 5 may be used, but inasmuch as these members are of identical construction, a description of one, with the same numerals, will suffice for both.

Thus one end of member 5 is connected to a bottom plate or leaf 8 clamped rigidly and removably to the spring beneath axle 4 by the clips or clevis 9. The opposite end of member 5 is connected by a bolt 10 to an eye 11 at the outer end of a relatively thin spring leaf 12, which leaf is interposed between two of the main leaves of the spring, and extends towards the axle any desired distance. The inner end of leaf 12 is spaced apart from but closely related to the end of a spacing leaf 14 of the same thickness as leaf 12, which spacing leaf 14 is clamped rigidly between the leaves of the main spring. Accordingly, leaf 12 may be shifted longitudinally between the leaves of the main spring, and it may also flex in the same degree. However, the longitudinal movement of leaf 12 is limited in view of its pivotal connection with controlling member 5, which swings or moves in a vertical plane with bolt 6 as the axis of movement whenever the main spring is bent or flexed either upwardly or downwardly, as occurs when there is relative movement vertically between the axle and the frame or body of the vehicle. Obviously, the load on the spring is distributed over all of the spring leaves, including supplemental leaf 12 which is free to reciprocate longitudinally in frictional engagement with two of the main leaves. Flexing of the main spring produces a creeping movement between the main leaves, but the longitudinal or creeping movement of supplemental leaf 12 is considerably greater than the creeping movement between the main leaves and therefore constant resistance or restraint is present within the spring itself especially to oppose sudden movement such as results from shocks and rebounds.

The top of member 5 is spaced apart from the top leaf of the main spring, except at its opposite ends where they rest upon said leaf. Member 5 is preferably made of metal and it is a stiff or rigid part, particularly when said member includes independent side flanges 15 to enclose the sides of the spring. The main spring is free to flex or bend on curved lines in respect to this rigid member 5, and the bottom may either be opened, or a bottom section 16 may be attached to the bolts 6 and 10, respectively, to completely enclose or house the spring, thereby providing a dust cover or guard or a holder for a lubricant as well as a connecting yoke for reciprocating supplemental leaf 12.

Figs. 7 to 12 inclusive on sheet 2 show a modified form of the invention, in that a supplemental leaf 12′ is connected to a short yoke member 5′ which is riveted or otherwise secured to a second supplemental leaf 18 seated upon the top leaf of main spring 3′. Leaf 18 is rigidly clamped to the main spring beneath axle 4′ by the clip or clevis 9″. Flexing of the main spring produces a creeping movement between the main leaves and the supplemental leaves, and leaf 12′ is shifted lengthwise between the leaves of the main spring in substantial degree, owing to its connection to yoke member 5′ and bolt 6′ situated or located a substantial distance below the upper leaf 18.

Referring to Figs. 13 to 17, inclusive, on Sheet 3, the spring controlling device in this instance comprises a pair of relatively thin plates or leaves 19 and 20 seated upon the top leaf 21 of a main spring 22. Supplemental leaf 20 is connected by bolt 23 to one end of a yoke member 24 which has depending sides or arms 25 to which a link 26 is connected by a bolt 27. Link 26 is also pivotally connected by a second bolt 28, to a base plate or bottom leaf 29, for the main spring at axle 30. Yoke member 24 is slidably coupled to the main spring by a coupling bolt 31 and a spring plate 32, and a bow spring 33 is interposed between the top of yoke member 24 and the supplemental leaf 19. Bow spring 33 presses the supplemental leaves 19 and 20 together and also presses leaf 20 against top leaf 21 of the main spring. Bow spring 33 also holds the bearing plate 17 against the bottom of one of the shorter leaves of the main spring where link 26 is coupled to the yoke member by bolt 27. The upper leaf 19 is pivotally connected at one end to a clamping plate 34 for the main spring, where attached to axle 30 by the clips or clevises 35. In operation, when the main spring is flexed the yoke member 24 is shifted lengthwise of the main spring in substantial degree, thereby shifting leaf 20 over top leaf 21 and relatively to the supplemental leaf 19. The friction between the said leaves checks or snubs the action of the main spring when flexed in either direction.

Figs. 18 to 21, inclusive, Sheet 4, disclose a further modification of the invention, comprising a flanged cover or yoke member 36 adapted to enclose the leaves of the main spring 37 between the axle 38 and the outer or free end of the main spring where connected to a shackle 39. Member 36 is connected by a bolt 40 to an eye 41 on a base plate or short leaf 42 of the main spring at axle 38, and the opposite end of member 36 is slidably connected to the upper leaves of the main spring near shack 39 by a cross bolt 43. The top of member 36 is spaced apart from the top leaf of the main spring, and one or more friction plates are carried by member 36 within the space or chamber above the main spring. As shown, two friction plates 44 and 45 respectively, are secured to member 36, plate 44 being attached by bolt 46 to the outer end of member 36, and the second plate 45 being hinged by a pin or bolt 47 to a hinge member 48 which is fastened by bolt 49 to the main spring between the clips or clevises 50, above axle 38. Short connecting bolts 51 unite plate 44 and the top of member 36 together, the bolts passing through slots or openings 52 in friction plate 45. Tension springs 53 are interposed between the heads or nuts on bolts 51 and the top of member 36, thereby placing a predetermined amount of tension between the friction plates. When the main spring is flexed the rigid cover, enclosure, or housing member 36 is caused to swing in a vertical plane with its axis of movement at bolt 40, thereby producing relative movement between the friction plates, 44 and 45, inasmuch as friction plate 45 is hinged at 47 at a point above and remote from pivot bolt 40. Flexing movements of the main spring in either direction, is thereby controlled or restrained and sudden snap actions smoothed or dampened.

What I claim, is:

1. A controlling device for leaf springs, including a spacing member for the leaves, a supplemental movable spring leaf interposed between the spaced leaves, and means for producing longitudinal movement of said supplemental leaf with respect to the leaves of the spring enclosing said supplemental leaf, said means being actuated by the flexing movements of the main leaves of the spring.

2. A controlling device for leaf springs, including a supplemental leaf interposed between two leaves of the main spring and movable in respect thereto, and a rigid connection for the supplemental leaf associated with said spring and pivoted to swing vertically in the plane of flexing movements of the main spring.

3. A controlling device for leaf springs, including a supplemental spring friction leaf, and a cover for the main spring connected with said leaf and hinged to swing to permit flexing of the main leaves and to shift said supplemental friction leaf relatively to said main leaves.

4. A controlling device for leaf springs, including a main spring, a cover for said main spring, and a friction device operatively connected with said cover and spring.

5. A controlling device for leaf springs, including a main spring, an enclosing member for said main spring hinged to swing in respect thereto, and a friction device connected with said enclosing member and main spring for controlling the flexing movements of the main spring.

6. A controlling device for leaf springs, including a supplemental friction leaf interposed between the main leaves of the spring, a housing member for the main spring connected at one end to the supplemental spring and its other end to a fixed part associated with the main spring.

7. A controlling device for leaf springs, including a supplemental spring leaf frictionally engaged with the main leaf of the spring, and means connecting one end of said supplemental leaf with the base portion of the main spring, said means being movably connected to said parts to permit it to follow the flexing movements of the main spring.

8. In a laminated vehicle spring rigidly attached to an axle, an independent leaf interposed between two main leaves of the spring, and an operating member connected with said independent leaf and said main spring close to its attachment with said axle whereby said interposed leaf is shifted in substantial degree relatively to the leaves of the main spring when said spring is flexed in either direction.

In testimony whereof I affix my signature.

GEORGE W. CRABTREE.